_United States Patent Office_ 2,972,629
Patented Feb. 21, 1961

2,972,629

OXIDATION OF 2-ALKOXYDIHYDROPYRANS

James C. Martin and James P. Hawk, Kingsport, Tenn., assignors to Eastman Kodak Company, Rochester, N.Y., a corporation of New Jersey No Drawing. Filed Aug. 6, 1957, Ser. No. 676,515

5 Claims. (Cl. 260—537)

This invention relates to a process for the oxidation of 2-alkoxydihydropyrans to produce carboxylic acids. More particularly, it relates to a process for the liquid phase catalytic oxidation of 2-alkoxydihydropyrans.

It is well known that pyrans can be oxidized. For instance tetrahydropyran has been oxidized to obtain deltavalerolactone. Longley and Emerson in the "Journal of the American Chemical Society," volume 72, pages 3079 (1950), disclose the synthesis of 3-methyl glutaric acid by the hydrolysis of 3,4-dihydro-2-methoxy-methyl-2H-pyran to 3-methyl glutaraldehyde, which was not isolated, followed by the oxidation of the aldehyde with potassium permanganate. Although the glutaraldehydes may be stabilized to some extent in water as a solvent, they are unstable and the oxidation has to be accompanied by a difficult and expensive isolation step due to the great water solubility of glutaric acid and the lower alkyl-substituted glutaric acids.

Applicants have discovered a process of oxidizing 2-alkoxydihydropyran to obtain glutaric acid or substituted glutaric acids which is direct and economical.

One object of our invention is to provide an economical process for converting 2-alkoxydihydropyrans into glutaric acids. Another object of this invention is to provide a process whereby 2-alkoxydihydropyrans can be converted to glutaric acids in a single operation. A still further object is to provide a process as described above that involves the use of ionic exchange resins as catalysts.

Our process comprises charging the 2-alkoxydihydropyran along with a strong acid catalyst which may be an ion exchange resin or a mineral acid and a fatty acid solvent into an oxidation column. A cobalt catalyst may also be used but it is not necessary for the operation of our process. The mixture is heated, and air or oxygen is passed in continuously at the bottom of the column, while water is added at the top of the column. The following equation indicates the process involved:

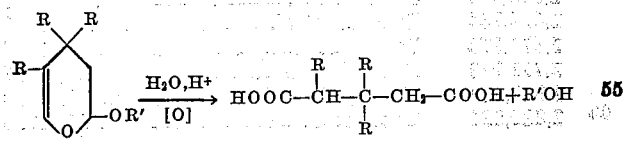

wherein R is alkyl having from 1–4 carbon atoms and R' is alkyl having from 1–4 carbon atoms. The fatty acid solvents which may be used in the operation of our invention are the lower aliphatic carboxylic acids, with the exception of formic acid. Such acids include acetic, propionic, butyric and iso-butyric.

Our process may be operated using a strong acid catalyst such as a mineral acid or an acidic ion exchange resin such as Amberlite IRA-120, Permutit Q or Dowex 50 which are sulphonated polystyrene-divinyl benzene copolymers. Other ion exchange resins which may be used are acidic ion exchange resins such as those prepared by the sulphonation of a phenol-formaldehyde resin, the sulphonation of a polystyrene, the sulphonation of the copolymer of methacrylic acid with divinyl benzene and similar ion exchange resins. An acidic ion exchange resin is preferred in our process, inasmuch as we obtain a better yield using this catalyst and find that it is easier to use.

A cobalt catalyst, the cobalt salt of a fatty acid, may be used in the oxidation, but is not essential to the functioning of this process. The oxidizing gas used may be air or oxygen, with air being preferred for economic reasons. The process may be run at atmospheric pressure or under several atmospheres of pressure.

We prefer to use a temperature within the range of 40–100° C.

The use of fatty acids as solvents permits the alcohol as formed to be taken out of the system as the ester of the acid used. We have found that the water should be added slowly during the oxidation, since if it is added all at one time a gummy, resinous product results.

The following examples are intended to illustrate our invention but are not intended to limit it in any way.

_Example 1_

One hundred twenty-four grams (0.97 mole) 3,4-dihydro-2-methoxy-4-methyl-2H-pyran, 400 ml. of glacial acetic acid and 20 grams of Amberlite IRA-120 ion exchange resin were charged into a glass oxidation column and heated to 70°. Air was introduced at the bottom of the column, and 30 ml. of water were added dropwise over a 3-hour period. The oxidation was continued for 7 hours. At the end of this time the reaction mixture was discharged from the column, filtered to remove the ion exchange resin and distilled through a 6-inch Vigreaux column. Collected 98.3 grams of material boiling at 165–167° C. at 0.5 mm. This material solidified readily and melted at 83–85°. This is 70% yield of 3-methylglutaric acid.

_Example 2_

One hundred twenty-eight grams (1.0 mole) of 3,4-dihydro-2-ethoxy-2H-pyran, 300 ml. of glacial acetic acid and 15 grams of Amberlite IRA-120 were charged into a glass oxidation column and heated to 60° C. Oxygen was introduced at the bottom of the column, and 40 ml. of water were added dropwise over a 1-hour period. The oxidation was continued for 3 hours. At the end of this time, the reaction mixture was discharged from the column, filtered to remove the ion exchange resin and evaporated to dryness on the steam bath. The crystalline residue was recrystallized from benzene to give a 73% yield of glutaric acid—melting point 97–98° C.

_Example 3_

One hundred twenty-eight grams (1.0 mole) of 3,4-dihydro-2-methoxy-5-methyl-2H-pyran, 400 ml. of butyric acid and 1 ml. of concentrated sulfuric acid were charged into a glass oxidation column and heated to 75° C. Air was introduced at the bottom of the column at the rate of 3 cubic feet per hour and 25 ml. of water were added dropwise over a 3-hour period. The oxidation was continued for 8 hours. At the end of this time, the reaction mixture was discharged from the column and sodium carbonate was added to neutralize the sulfuric acid. The low boilers were stripped off under vacuum and the residue solidified on cooling. This was recrystallized from a chloroform-hexane mixture to give a 62% yield of 2-methylglutaric acid—melting point 75–77° C.

By reacting acrolein and methyl vinyl ether together, 3,4-dihydro-2-methoxy-2H-pyran may be prepared and 3,4-dihydro-2-methoxy-4-methyl-2H-pyran results from the reaction of croton-aldehyde and methyl vinyl ether.

Glutaric acid which is obtained using our process and its esters have many uses such as polyurethane rubbers, turbojet lubricants, modifiers for linear polyesters and the like.

The terms "strong acid catalyst" is intended herein to refer to mineral acids and to acidic ion exchange resins.

We claim:

1. A process for converting a 2-alkoxy-3,4-dihydro-2H-pyran having the following formula:

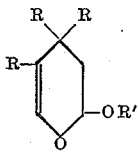

in which R is selected from the class consisting of alkyl radicals having from 1 to 4 carbon atoms and H and R' is alkyl having from 1 to 4 carbon atoms, into a dibasic acid selected from the class consisting of glutaric and alkyl substituted glutaric acids which comprises dissolving the 2-alkoxy-3,4-dihydro-2H-pyran in a fatty acid solvent selected from the class consisting of glacial acetic, propionic, butyric and isobutyric acids, adding a strong acid catalyst, heating to a temperature of 40–100° C., passing a gas selected from the class consisting of air and oxygen into the resultant solution and adding 1.4–2.2 moles of water per mole of pyran slowly.

2. A process for converting a 2-alkoxy-3,4-dihydro-2H-pyran having the following formula:

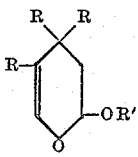

in which R is selected from the class consisting of alkyl radicals having 1 to 4 carbon atoms and H and R' is alkyl having from 1 to 4 carbon atoms, into a dibasic acid selected from the class consisting of glutaric and alkyl substituted glutaric acids which comprises charging the 2-alkoxy-3,4-dihydro-2H-pyran, a strong acid catalyst and glacial acetic acid into an oxidation column, heating the mixture to a temperature of 40–100° C., passing a gas selected from the class consisting of oxygen and air continuously through the solution in counter-current flow and adding 1.4–2.2 moles of water per mole of pyran slowly to the solution.

3. A process for converting a 2-alkoxy-3,4-dihydro-2H-pyran having the following formula:

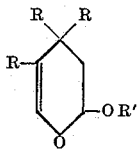

in which R is selected from the class consisting of alkyl radicals having 1 to 4 carbon atoms and H and R' is alkyl having 1 to 4 carbon atoms into a dibasic acid selected from the class consisting of glutaric and alkyl substituted glutaric acids which comprises charging the 2-alkoxy-3,4-dihydro-2H-pyran, a strong acid catalyst and a fatty acid solvent selected from the class consisting of glacial acetic, propionic, butyric and isobutyric acids into an oxidation column, heating the mixture to a temperature within the range of 40–100° C. and passing air in counter-current flow through the solution while adding 1.4–2.2 moles of water per mole of pyran slowly to the solution.

4. A process for converting a 2-alkoxy-3,4-dihydro-2H-pyran having the following formula:

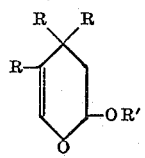

wherein R is selected from the class consisting of alkyl radicals having 1 to 4 carbon atoms and H and R' is alkyl having 1 to 4 carbon atoms into a dibasic acid selected from the class consisting of glutaric and alkyl substituted glutaric acids which comprises charging the 2-alkoxy-3,4-dihydro-2H-pyran, a strong acid catalyst selected from the class consisting of a mineral acid and an acidic ion exchange resin, and a fatty acid selected from the clsss consisting of glacial acetic, propionic, butyric and isobutyric acids into an oxidation column, heating the mixture to a temperature within the range of 40–100° C. and passing a gas selected from the class consisting of air and oxygen in counter-current flow through the solution while adding 1.4–2.2 moles of water per mole of pyran slowly to the solution.

5. A process for converting a 2-alkoxy-3,4-dihydro-2H-pyran having the following formula:

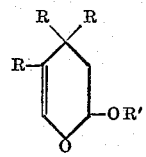

wherein R is selected from the class consisting of alkyl radicals having 1 to 4 carbon atoms and H and R' is alkyl having 1 to 4 carbon atoms into a dibasic acid selected from the class consisting of glutaric and alkyl substituted glutaric acids which comprises charging the 2-alkoxy-3,4-dihydro-2H-pyran, a strong acid catalyst selected from the class consisting of a mineral acid and an acidic ion exchange resin and a carboxylic acid selected from the class consisting of glacial acetic, propionic, butyric and isobutyric acids into an oxidation column, heating the mixture to a temperature within the range of 40–100° C. and passing air in countercurrent flow through the solution while adding 1.4–2.2 moles of water per mole of pyran slowly through the solution.

References Cited in the file of this patent

UNITED STATES PATENTS

| | | |
|---|---|---|
| 1,995,614 | Jaeger | Mar. 26, 1935 |
| 2,452,741 | Fleming | Nov. 2, 1948 |
| 2,463,776 | Jones et al. | Mar. 8, 1949 |
| 2,513,766 | Whetstone | July 4, 1950 |
| 2,546,018 | Smith et al. | Mar. 20, 1951 |
| 2,624,764 | Emerson et al. | Jan. 6, 1953 |
| 2,670,370 | Toland | Feb. 23, 1954 |
| 2,793,228 | Florentine | May 21, 1957 |
| 2,820,820 | Montagna et al. | Jan. 21, 1958 |
| 2,820,821 | Guest et al. | Jan. 21, 1958 |

FOREIGN PATENTS

| | | |
|---|---|---|
| 415,172 | Great Britain | Aug. 23, 1934 |
| 881,993 | France | Feb. 8, 1943 |
| 875,295 | France | May 21, 1942 |

OTHER REFERENCES

Codignola et al.: Chem. Abs., vol. 45, 7587 (h).

Longley et al.: J. Am. Chem. Soc., 72, 3079–3081 (1950).